(12) United States Patent
Stanek et al.

(10) Patent No.: US 11,280,358 B2
(45) Date of Patent: Mar. 22, 2022

(54) METHOD FOR MONITORING THE CONDITION OF THE HYDRAULIC SYSTEM

(71) Applicant: Jihostroj a.s., Velesin (CZ)

(72) Inventors: Frantisek Stanek, Velesin (CZ); Radovan Charwot, Velesin (CZ)

(73) Assignee: JIHOSTROJ A.S., Velesin (CZ)

( * ) Notice: Subject to any disclaimer, the term of this patent is extended or adjusted under 35 U.S.C. 154(b) by 343 days.

(21) Appl. No.: 16/294,985

(22) Filed: Mar. 7, 2019

(65) Prior Publication Data
US 2020/0284276 A1    Sep. 10, 2020

(51) Int. Cl.
| | |
|---|---|
| *F15B 19/00* | (2006.01) |
| *G01N 11/00* | (2006.01) |
| *G05B 23/02* | (2006.01) |
| *F04B 51/00* | (2006.01) |
| *F04B 49/06* | (2006.01) |
| *G05B 19/418* | (2006.01) |
| *F04B 49/10* | (2006.01) |

(52) U.S. Cl.
CPC .......... *F15B 19/005* (2013.01); *F04B 49/065* (2013.01); *F04B 49/103* (2013.01); *F04B 51/00* (2013.01); *G01N 11/00* (2013.01); *G05B 19/4184* (2013.01); *G05B 23/0205* (2013.01); *G05B 23/0259* (2013.01); *G01N 2011/0093* (2013.01)

(58) Field of Classification Search
CPC ............ F15B 19/005; F15B 2211/6343; F15B 2211/6309; F15B 2211/857; F15B 2211/8636; F15B 2211/865; F15B 2211/633; G05B 23/0205; G05B 23/0259; G05B 19/4184; F04B 51/00; F04B 49/065; F04B 49/103; G01N 11/00; G01N 2011/0093
See application file for complete search history.

(56) References Cited

U.S. PATENT DOCUMENTS

| | | | |
|---|---|---|---|
| 4,998,949 A | 3/1991 | Cantwell | |
| 2005/0022589 A1* | 2/2005 | Du | F15B 19/005 73/168 |
| 2010/0212306 A1* | 8/2010 | Batenburg | F15B 11/08 60/327 |
| 2012/0167594 A1 | 7/2012 | Poisson et al. | |

(Continued)

FOREIGN PATENT DOCUMENTS

| | | |
|---|---|---|
| EP | 0851122 B1 | 5/2004 |
| JP | 61104263 A | 5/1986 |
| KR | 20070024776 A | 3/2007 |

*Primary Examiner* — Alexander Satanovsky
(74) *Attorney, Agent, or Firm* — Mark M. Friedman

(57) ABSTRACT

The method for monitoring the condition of the hydraulic system for predicting the risk of failure is designed for hydraulic systems, whose components include at least one pump (1) for transporting fluid through the distribution system of the hydraulic system. The hydraulic system simultaneously detects at least one current magnitude of pressure and the current value of speed of the pump (1), whereupon the current speed value is compared with the trend speed value obtained from the statistically processed archived data of speed from the previous operation of the pump (1) and/or with the reference speed value of the pump (1), whereupon the comparison result provides the condition and risk of failure of the hydraulic system.

7 Claims, 2 Drawing Sheets

(56) References Cited

U.S. PATENT DOCUMENTS

| | | | |
|---|---|---|---|
| 2012/0325348 A1* | 12/2012 | Heitz | F02M 65/00 |
| | | | 137/565.15 |
| 2014/0129111 A1 | 5/2014 | Schaeffer et al. | |
| 2014/0138399 A1* | 5/2014 | Estelle | F04B 9/125 |
| | | | 222/1 |
| 2018/0087499 A1* | 3/2018 | Zhang | F04B 19/22 |
| 2018/0100496 A1 | 4/2018 | Zhang et al. | |

\* cited by examiner

METHOD FOR MONITORING THE CONDITION OF THE HYDRAULIC SYSTEM

FIELD OF THE INVENTION

The invention relates to a method for monitoring the hydraulic system for predicting the risk of failure, in particular, of the hydraulic systems deployed in the area of aviation engineering.

BACKGROUND OF THE INVENTION

Hydraulic systems are used to transport fluids and usually consist of a fluid distribution system, which is controlled by valves, with the fluid injected into the distribution system by pumps. Fluid in the distribution system of the hydraulic system is transported under pressure and it is therefore necessary to ensure that components constituting the hydraulic system are resistant to compressive stress. At the same time, hydraulic systems undergo regular service inspections, during which the function, passability and tightness of the components of the hydraulic system are checked.

Service inspections are particularly important in the field of aviation engineering, where technical failure could lead to disastrous consequences. For this reason, service inspections are ordered after working the given number of operating hours. However, even this approach is not perfect, because in the test traffic modelling and setting of tabulated values of operating hours for the components of the hydraulic system, it is impossible to include load of actual air traffic, which is affected, for example, by handling by pilots, jobs of aircraft, climate conditions, etc.

One of the hydraulic systems falling within aviation engineering is the fuel system. The fuel hydraulic system for jet engines consists of a fuel tank from which the fuel is transported by a pump into nozzles of a jet engine. The fuel metering pump has a dual function: first, to transport the fuel and second, to meter the fuel. Fuel metering is done by changing the speed of the fuel metering pump. If the fuel metering pump fails, it could transport the excess fuel into the engine, which could result in overspeeding of the engine or shortage of fuel, which could lead to a sudden decrease in engine power. The operation of the fuel metering pump is controlled by a control unit, which consists of control electronics, which includes a communication interface for communication with external devices, a processor for executing the program, and data storage for storing software modules and other data.

To prevent failure of fuel hydraulic systems, the system of regular inspections after working the given number of operating hours of the fuel metering pump is complemented by the invention known from US 2012/167594 A1 (Poisson Richard). The invention presents the creation of an additional fuel distribution in the hydraulic system, specifically between the outlet of the high pressure of fuel metering pump and the inlet to the hydraulic system for monitoring the pressure loss on the fuel metering pump. The loss is evaluated by monitoring pressure changes.

Disadvantages of the invention are that it is necessary to extend the existing hydraulic system to include an additional distribution system, which complicates the hydraulic system, which may be the focus of failure of the hydraulic system, which means extra mass load, which is particularly undesirable in aviation engineering. However, the most important disadvantage of the invention is that it relates to the monitoring of fuel metering pump only and that the possibility of failure is not monitored for other components of the hydraulic system.

The present invention is to provide a method for monitoring the condition of the hydraulic system for predicting the risk of failure of the hydraulic system, which could be performed easily, without major design changes to the hydraulic system, and which would be readily applicable to new and existing hydraulic systems.

SUMMARY OF THE INVENTION

The task is solved by means of a method for monitoring the hydraulic system for predicting the risk of failure made in accordance with the invention below.

The method relates to monitoring of the condition of the hydraulic system, whose components include at least one pump for transporting fluid through the distribution system of the hydraulic system.

The summary of the invention rests in the fact that it simultaneously detects at least one current magnitude of pressure in the hydraulic system and current speed value of the fuel metering pump. Subsequently, the current speed value is compared with the trend speed value obtained from the statistically processed archived values of speed from the previous operation of the fuel metering pump for the current magnitude of pressure and/or with the specified speed value of the fuel metering pump for the current magnitude of pressure. Finally, the result of comparison of the current speed value with the trend speed value and/or the specified speed value is used to determine the risk of failure of the hydraulic system.

The specified speed value is the tabulated value, which is given by the supplier of the pump for the hydraulic system. This value applies to the pump after installation in the hydraulic system or, for example, after overhaul. Experiments have found that having worked by the number of operating hours, the current speed value of the pump for the specific pressure differs from the specified value, therefore it is more advantageous to monitor the long-term trend and use it to determine the trend speed value, which is compared, for predicting the risk, with the current speed value of the pump to make the comparison objective and reflecting the operating hours worked of the pump.

The fact that the pressure in fluid is the same at all points is preferably used. It is also known that transport of fluid with nominal pressure requires to operate the pump at the given speed value. If it is found that the pump speed is higher for the certain magnitude of pressure, it can be assumed that there is leakage of fluid in the hydraulic system. Service should focus, for example, to locate leakages of fluid. In the event that induction of a certain magnitude of pressure requires actually smaller speed of the pump, it can be assumed that there is, for example, clogging of the components of the hydraulic system. In this case, service should focus on components with flow restriction such as nozzles and filters.

In a preferred embodiment of the invention, at least one current magnitude of pressure in the hydraulic system is compared with the predefined threshold magnitude of pressure, wherein speed of the fuel metering pump is detected and recorded from the moment of reaching the threshold magnitude of pressure. It has been found that it is unnecessary to monitor pump speed during its start, because the pump is started, for example, by the actual start of the engine, and until the pump speed reaches the level of operation as at idle, then the measured values to predict the risk of failure are insignificant.

It is preferred for the embodiment of the invention when the threshold magnitude of pressure is set by means of at least one hydraulic switches or sensor included in the hydraulic system. In terms of design, the hydraulic switch or sensor is a simple component that shows a high level of reliability, is small in size and mass, which makes it very suitable for aviation engineering. The hydraulic switch can be set to any threshold magnitude of pressure, wherein as soon as this magnitude of pressure is reached, the switch closes, thus activating, for example, detection of the current speed value of the pump. Use of the hydraulic switches means the minimum intervention in the hydraulic system. By deploying the hydraulic switch, it is not necessary to use complex and expensive metering valves and other similar components. In a preferred embodiment of the invention, a differential pressure switch or sensor is used for adjusting the pressure drop.

Last but not least, the preferred embodiment of the invention is the embodiment, in which the viscosity of fluid is taken into account in the determination of the condition and risk of failure of the hydraulic system. Two types of fuel will behave differently in the same hydraulic system and cause differences in the operation of the hydraulic system. Preferably, the current temperature of the fluid transported in the hydraulic system is detected because the viscosity changes with the temperature of fluid.

Furthermore, the preferred embodiment of the invention is the embodiment in which, simultaneously with the closing of the hydraulic switch, the input power to the hydraulic system is recorded and then the output power of the hydraulic system is calculated for the predefined threshold magnitude of pressure and then the efficiency of the hydraulic system is determined from input power and output power. The resulting trend of efficiency of the hydraulic system can specify the prediction of risk of failure of the hydraulic system. The efficiency of hydraulic system declining on a long-term basis may be a sign of progressive failure of some of the components of the hydraulic system.

The advantages of the new method for monitoring the condition of the hydraulic system include a simple application in the existing hydraulic systems, in particular suitable for aviation engineering, reliability and accuracy. Although the invented method does not precisely show the failing component of the hydraulic system, information about the risk of failure is accurate enough to perform extra service inspection. The service inspection can be focused either on the fluid leak, or on the blockage of the components of the hydraulic system, or on wear of the components of the hydraulic system.

EXPLANATION OF DRAWINGS

The present invention will be explained in detail by means of the following figures where.

EXAMPLE OF THE INVENTION EMBODIMENTS

It shall be understood that the specific cases of the invention embodiments described and depicted below are provided for illustration only and do not limit the invention to the examples provided here. Those skilled in the art will find or, based on routine experiment, will be able to provide a greater or lesser number of equivalents to the specific embodiments of the invention which are described here. Also such equivalents will be included in the scope of the following claims.

Figure 1:
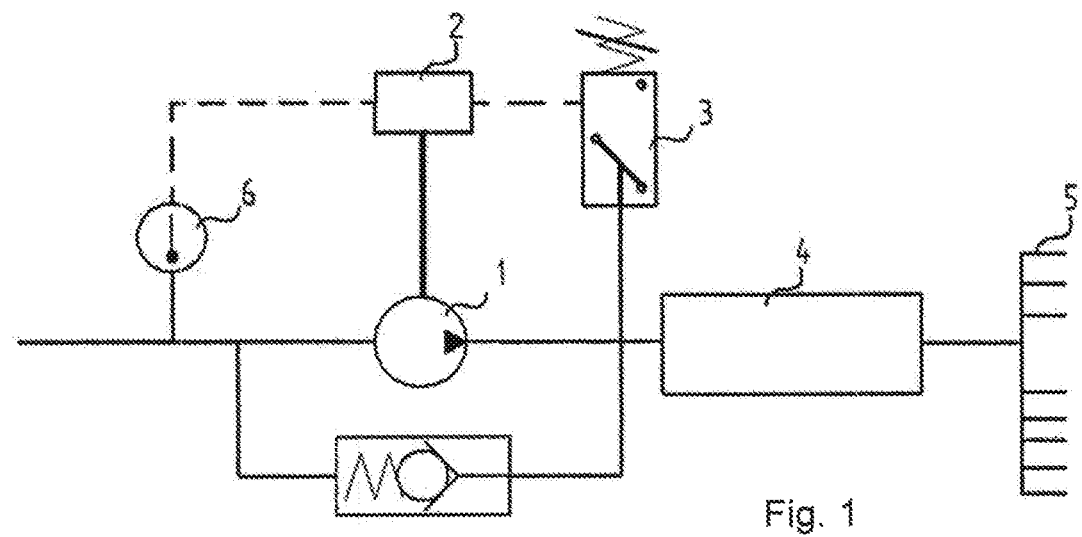
FIG. 1 shows a schematic diagram of a hydraulic system.

FIG. 1 shows a schematic diagram of a hydraulic system. The hydraulic system in this embodiment of the invention comprises at least one pump 1, which is connected via the fluid distribution system to the flow divider 4 that distributes the fluid to the individual nozzles 5 of the jet engine of the aircraft. The operation of the pump 1 is controlled by its control unit 2, which consists of control electronics comprising at least one communication interface for communication with external electronic device, e.g. sensors, control computer, indicator on the dashboard, etc., as well as at least one processor for running the control program, and furthermore at least one data storage for storing at least one software module and archiving the measurement data.

There can be a variety of hydraulic systems and an expert will not have a problem to exchange one hydraulic system for another hydraulic system as part of his/her routine work. References in the example of embodiment of the invention to the hydraulic system in aviation engineering cannot be the only reason to limit the scope of protection of the invention.

In this embodiment of the invention, the pump 1 is the fuel metering pump, which is used for metering fuel into nozzles 5 of the jet engines of the aircraft. The fuel metering pump includes an integrated control unit 2 and the hydraulic switch 3, which is set to the threshold pressure of 2 MPa. This threshold pressure is reached by the pump 1 at speed at the level of engine idle. The hydraulic switch 3 consists of the simple component, which comprises the resistive spring compressed by fluid pressure in the hydraulic system. When the spring is compressed, the pressure increased to the threshold value and the hydraulic switch 3 closes. Closing the hydraulic switch 3 sends an electrical signal to the control unit 2, which starts recording the speed of the pump 1. Speed measurement of the pump 1 takes place only after closing of the hydraulic switch 3.

The invented method works by measuring the value of speed of the pump 1 for the current magnitude of pressure. When the measured speed is higher than it should be for the current magnitude of pressure, the fluid most probably leaks from the hydraulic system, because this pressure loss must be compensated by higher value of speed of the pump 1. From this condition of the hydraulic system, the risk of failure is assessed and therefore, the extra service inspection is ordered.

If the measured speed of the pump 1 is lower than it should be for the current magnitude of pressure, the fluid most probably does not flow through the hydraulic system as it should and, therefore, the pressure is reached already at lower speed of the pump 1. The risk of failure of the hydraulic system is assessed and, therefore, the extra service inspection is ordered.

Figure 2:
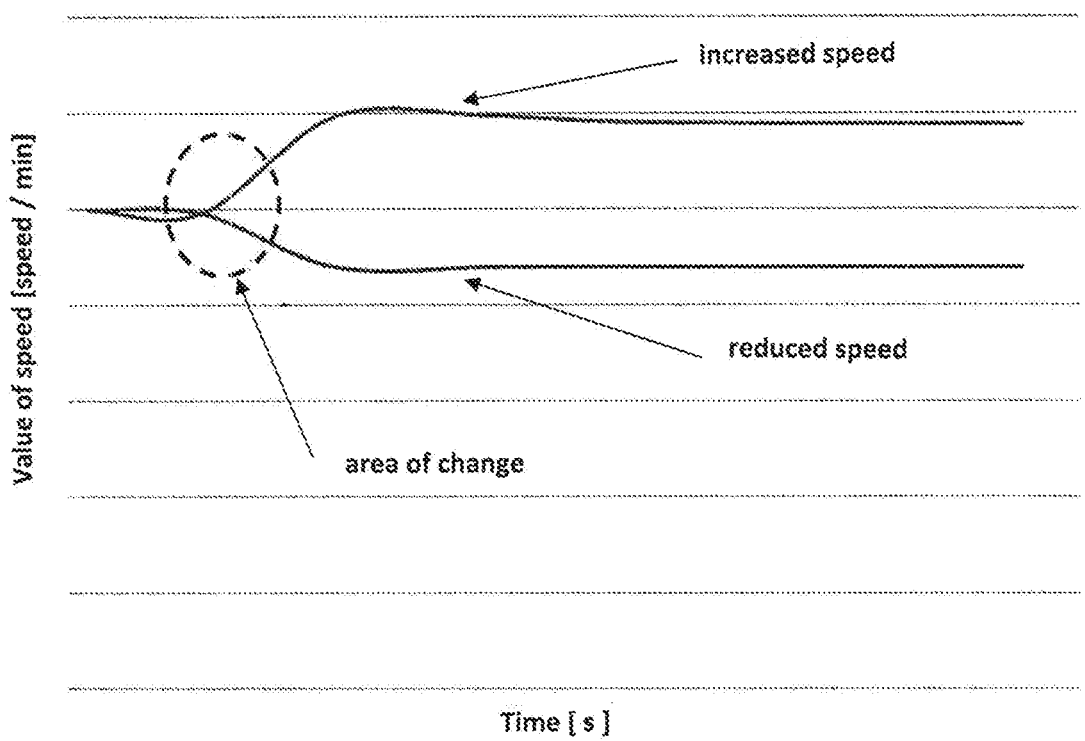
FIG. 2 shows a graph of current pump speed over time.

Both of the above options for changing the speed are graphically illustrated in FIG. 2, which presents the speed of the pump 1 over past time, for example for threshold pressure of 2 MPa.

The operating characteristics of the pump 1 changes with the number of the hours of operation worked, which is reflected in the trend of values obtained from the archived data from the previous operation. These trends of values are used to detect not only sudden changes indicating a risk of failure, but also to detect the successive non-standard changes indicating a risk of failure. Data and software module for determining the trend are stored in the control unit 2 of the pump 1.

Figure 3:
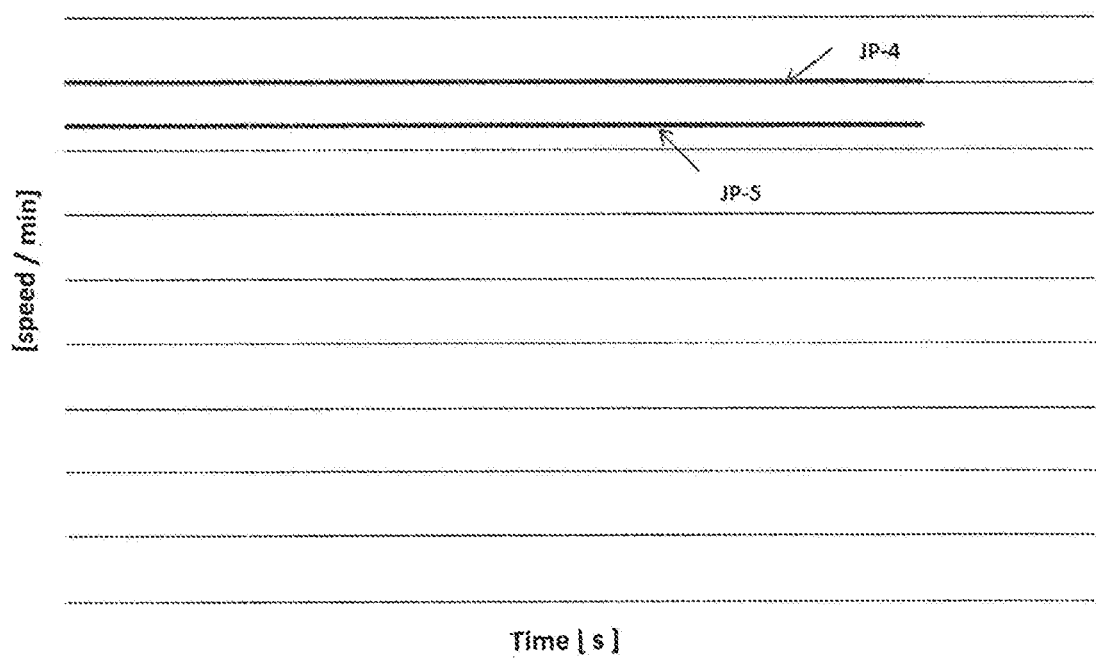
FIG. 3 shows a graph of the values of current pump speed over time for different types of fluids.
Figure 4:
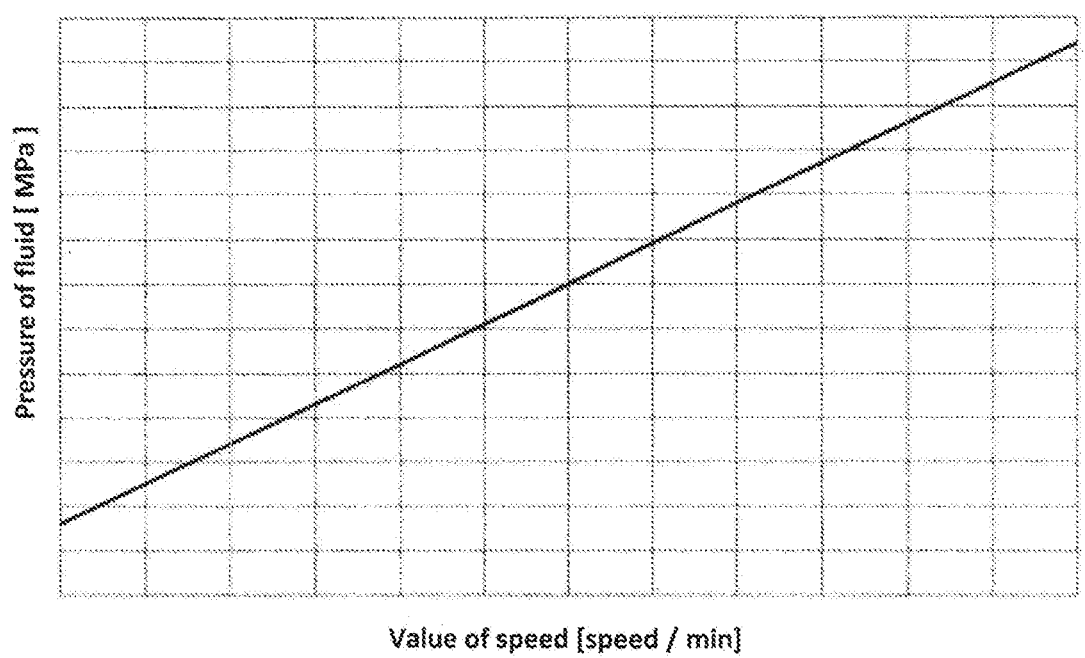
FIG. 4 shows a graph of the values of current pump speed over time for the rising fluid temperature.

FIG. 3 shows a graph of influence of the type of fluid on speed of the pump 1. In one case, the fluid is the aviation fuel JP-4 and in the other case, the fluid is the aviation fuel JP-5. Furthermore, FIG. 4 shows a graph of influence of the action of the current temperature of fluid indicated by sensor 6 on speed of the pump 1.

It is also possible to monitor the efficiency of the hydraulic system and track it in the trend with the increasing number of the hours of operation worked. The input power of the hydraulic system is measured at the moment of switching the detection of speed. Since speed detection is switched after reaching the defined pressure, the output power of the hydraulic system can be calculated. Then, the efficiency of the hydraulic system is determined using the formula for calculating the efficiency. Knowledge of the efficiency specifies the prediction of risk of failure of the hydraulic system.

INDUSTRIAL APPLICABILITY

A method for monitoring the condition of the hydraulic circuit of the invention finds application in the transport industry, in particular in aviation engineering.

OVERVIEW OF THE INDEXES

1 pump
2 control unit
3 hydraulic switch
4 flow divider
5 nozzle
6 fluid temperature sensor

The invention claimed is:

1. A method for monitoring the condition of a hydraulic system for predicting the risk of failure, whose components include a pump for transporting fluid through a distribution system of the hydraulic system, the method comprising:
   detecting at least one current magnitude of pressure in a hydraulic system and a simultaneous current speed value of the pump:
   performing at least one comparison, chosen from a group consisting of:
   comparing the current speed value with archived speed values from previous operation of the pump, said archived speed values having a corresponding, simultaneously detected magnitude of pressure similar to the current magnitude of pressure,
   and comparing the current speed value with a reference speed value of the pump, said referenced speed value having a simultaneously detected magnitude of pressure the current magnitude of pressure;
   whereupon the comparison result provides the condition and risk of failure of the hydraulic system;
   wherein the method further comprises:
   comparing the current magnitude of pressure in the hydraulic system -with a predefined threshold magnitude of pressure, wherein the archived speed value is recorded and archived from a moment of reaching the threshold magnitude of pressure, the threshold magnitude of pressure is set by means of a hydraulic switch included in the hydraulic system;
   recording an input power to the hydraulic system simultaneously with a closing of the hydraulic switch;
   calculating an output power of the hydraulic system for the predefined threshold magnitude of pressure; and
   calculating an efficiency of the hydraulic system from the input power and the output power.

2. The method of claim 1 wherein during calculating of the efficiency of the hydraulic system a differential hydraulic switch is used.

3. The method of claim 1 wherein during calculating the efficiency of the hydraulic system the viscosity of fluid is taken into account.

4. The method of claim 3 wherein during calculating the efficiency of the hydraulic system the current temperature of the fluid transported in the hydraulic system is detected and then the current viscosity of fluid is determined according to the measured current temperature.

5. The method of claim 1 wherein the viscosity of fluid is taken into account in determining the condition and risk of failure of the hydraulic system.

6. The method of claim 1 wherein the viscosity of fluid is taken into account in determining the condition and risk of failure of the hydraulic system.

7. The method of claim 2 wherein the viscosity of fluid is taken into account in determining the condition and risk of failure of the hydraulic system.

* * * * *